United States Patent [19]

Dyson

[11] 4,417,881
[45] Nov. 29, 1983

[54] DRIVE SHAFT SEAL

[75] Inventor: Lewis L. Dyson, Bedford, Tex.

[73] Assignee: Textron Inc., Providence, R.I.

[21] Appl. No.: 329,750

[22] Filed: Dec. 11, 1981

Related U.S. Application Data

[63] Continuation of Ser. No. 46,032, Jun. 6, 1979, abandoned.

[51] Int. Cl.$^3$ ............................................. F16D 3/18
[52] U.S. Cl. .................................. 464/150; 464/158
[58] Field of Search ................. 464/16, 155, 158, 161, 464/170, 156, 150

[56] References Cited

U.S. PATENT DOCUMENTS

| | | | |
|---|---|---|---|
| 2,691,875 | 10/1954 | Schmitter | 464/161 |
| 2,873,589 | 2/1959 | Crankshaw | 464/158 |
| 2,914,929 | 12/1959 | Irons | 464/158 X |
| 2,959,943 | 11/1960 | Allen | 464/158 |
| 3,368,369 | 2/1968 | Kimmel | 464/170 X |
| 3,757,535 | 9/1973 | Stein | 464/76 |
| 3,981,158 | 9/1976 | Watson | 464/3 X |
| 3,999,404 | 12/1976 | Banki et al. | 464/32 |

FOREIGN PATENT DOCUMENTS

| | | |
|---|---|---|
| 1062071 | 7/1959 | Fed. Rep. of Germany . |
| 368425 | 1/1973 | U.S.S.R. . |

*Primary Examiner*—Stanley N. Gilreath
*Assistant Examiner*—Daniel P. Stodola
*Attorney, Agent, or Firm*—Richards, Harris & Medlock

[57] ABSTRACT

A drive shaft coupling (10) where lubricant is to be maintained in a zone of contact between a crown gear (17) and a nested interior annular spline structure (18) which is substantially coaxial to said crown gear (17). Support structure supports the crown gear (17) and is coupled centrally to the shaft (10). A resilient seal ring (35) on the shaft (10) is located at about the medial plane of the crown gear (17). A flanged cylindrical wear sleeve (30) encloses the spline (18) and crown gear (17) and a movable annular resilient contact with the seal ring (35).

4 Claims, 1 Drawing Figure

DRIVE SHAFT SEAL

This is a continuation of application Ser. No. 046,032 filed June 6, 1979, now abandoned.

TECHNICAL FIELD

This invention relates to sealing lubricants in a coupling on a floating drive shaft as employed in helicopters.

BACKGROUND ART

Heretofore, the mechanical drive from a helicopter turbine engine to the helicopter transmission has involved a floating shaft. That is, the shaft is coupled through a spline on the output of the turbine to a crown gear at one end and through a crown gear to splines on the other end. The drive shaft is restrained normally in a mean position but is permitted to move axially, opposing normally balanced spring forces.

In operation of a crown gear-spline unit, lubricant is required to be maintained to avoid undue wear. In prior shaft designs the sealing arrangement to prevent leakage of the lubricant was positioned axially away from the pivotal plane of the couplings, causing relative lateral displacement of the outer and inner couplings when misaligned. Relatively large motion makes it impossible to use lip-type seals and other sealing arrangements have been found to be difficult. Rubber boots have been used on some drive shafts, but boot life generally is found to be low and failures result. This is because shaft design requires the boots to be located well away from the pivotal axis of the coupling so that they must flex through large amounts of motion with each revolution of the shaft. Sliding rings have also been used, but these, too, necessarily have been located away from the pivotal plane and have suffered large amounts of motion resulting in rapid wear rates.

DISCLOSURE OF THE INVENTION

The present invention is directed to the establishment and maintenance of a lubricant seal at the pivotal plane of a coupling between a floating shaft and a driving or driven member. In a more specific aspect, the invention relates to a system where a lubricant is to be maintained between a drive shaft crown gear which meshes with and is located inside an annular spline. Structure defining a first cup supports the spline on the inner lip portion thereof. Structure forming a second cup is nested in the first cup and supports the crown gear on the outer lip portion thereof and is coupled centrally to the shaft. A flanged cylindrical wear sleeve is coupled as a closure at the rim of the flange thereof to the inner lip perimeter of the first cup to enclose the spline. An open cylindrical end portion thereof extends inside the second cup to a point substantially beyond the pivotal plane of the crown gear. A resilient seal ring is located at about said median plane of the crown gear to establish a lubricant seal between the shaft and the interior surface of the cylinder at about the pivotal plane of the crown gear.

DETAILED DESCRIPTION

Figure 1:
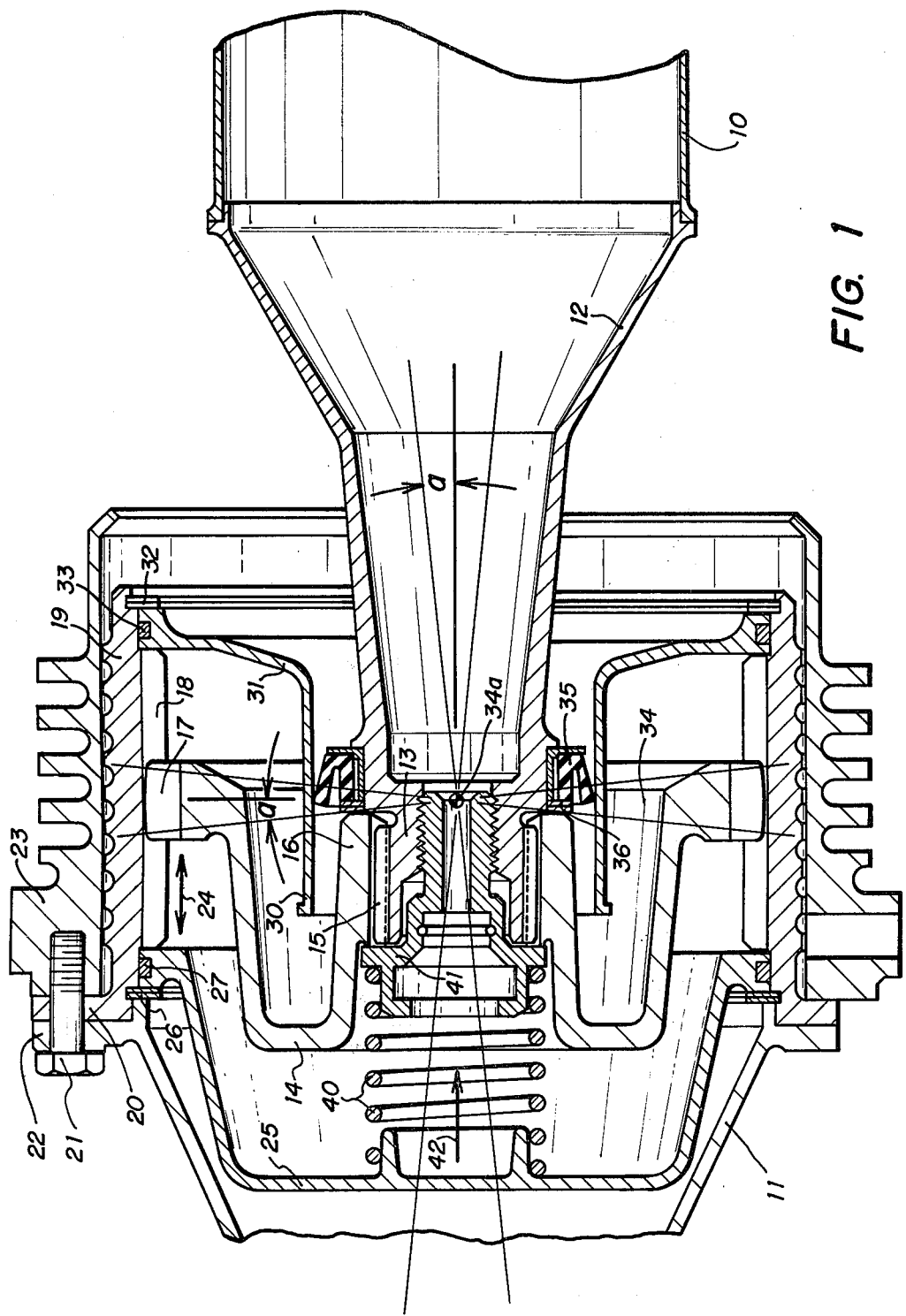
FIG. 1 is a sectional view of a lubricant seal embodying the present invention in a helicopter drive shaft coupling.

Referring now to FIG. 1, one end of a drive shaft 10 has been illustrated in section with a coupling between the drive shaft and a driven member, namely a transmission flange 11 being shown in detail. A coupling of the type shown is utilized in order to accomodate slight amounts of misalignment between the axis of the shaft 10 and the axis of the transmission flange 11. A conical fixture 12 closes the end of the shaft 10 and terminates in a spindle 13. The spindle 13 supports a cup structure 14 being coupled thereto by way of mating splines 15 on the outer surface of spindle 13 and on the inner surface of an inverted bottom portion 16 of cup 14. Cup 14 supports a crown gear 17 on the outer periphery of the lip of cup 14. The crown gear 17 meshes with an elongated annular spline 18 on the inner surface of a flanged cylinder 19. Cylinder 19 has a flange 20 thereof which is coupled as by a bolt 21 to a rim 22 forming part of the transmission flange 11. An outer ribbed cylindrical housing 23 encircles the cylinder 19 and is coupled thereto by bolt 21 which extends through flange 20. By this means, rotational drive forces may be transmitted from shaft 10 to transmission flange 11 to power the helicopter transmission system as it drives a helicopter rotor system.

When the axis of shaft 10 is misaligned with the axis of the transmission flange 11 the crown gear 17 will be moved in accordance with arrow 24 as the crown gear 17 revolves driving spline 18. It is necessary to maintain lubrication between crown gear 17 and spline 18. This is accomplished in accordance with the present invention by the following structure.

Cylinder 19 is closed on the transmission flange side by a pan 25, the lip of which abuts the end of spline 18 and is maintained as a closure for cylinder 19 by a snap ring 26 with a lubricant seal being established by an O ring 27.

A relatively small radius cylinder 30 having a flange 31 is mounted with the flange 31 abutting the end of spline 18 opposite pan 25. Flange 31 is maintained in position by snap ring 32. A lubricant seal is maintained by O ring 33. Cylinder 30 extends inside cup 14 to a point well beyond the pivotal or median plane 34 of crown gear 17 and serves as a cylindrical wear sleeve. A U-shaped sealing ring 35 is mounted in an annular cup 36 which is in turn mounted on the outer surface of the spindle 13. The sealing ring 35 makes contact with the interior surface of cylinder 30 at points in the pivotal plane 34. By this means, if shaft 10 is misaligned with respect to the axis of transmission flange 11, relative motion between the point of contact of the sealing ring 35 and the interior surface of cylinder 30 is very slight.

Sealing ring 35 permits axial movement of shaft 10 relative to transmission flange 11. It will be noted that a spring 40 is mounted between the bottom of pan 25 and a bolt 41 which is served inside the end of spindle 13. Spring 40 tends to move the shaft 10 in the direction of arrow 42. While not shown, a coupling identical to that shown in FIG. 1 will be provided on the opposite end of the shaft 10 so that the shaft 10 is a floating shaft, maintained at a mean position by spring 40 and a like spring on the opposite end of shaft 10. Thus, the sealing ring 35 accomodates translational movement of shaft 10 axially relative to transmission flange 11, and also accomodates pivotal action around the point 34a as may be necessary to accomodate misalignment between the axis of shaft 10 and the axis of transmission flange 11. By this means the grease seal is located at the pivotal plane of the coupling, resulting in no lateral displacement of the seal lip when the coupling is misaligned. This is an inside-out seal which maintains the relative position fixed and does not change when the coupling slides with pylon motion, but remains on the pivotal axis.

In a representative installation, the diameter of the crown gear teeth was about 4 inches. The seal 35 was of the type manufactured and sold by Johns-Mansville, type 0. The shaft 10 operates normally at about 20,000 rpm, with misalignments of the order of 4° to 5°, being accomodated by the coupling structure here described.

I claim:

1. In a coupling for one end of a floating drive shaft where lubricant is to be maintained in a zone of contact between a crown gear and an elongated interior spline, the combination which comprises:
   (a) a cylinder interiorly supporting said spline substantially coaxial of said one end of said shaft and closed by a pan structure having a lip which engages the end of said cylinder adjacent to said one end of said shaft;
   (b) support structure nested in said cylinder supporting said crown gear from said one end of said shaft;
   (c) a cylindrical wear sleeve encompassing the end of said shaft and having a flange closure engaging and partially closing the end opposite said closed end of said cylinder to enclose said spline and having an open end portion spanning the pivotal plane of said crown gear radially inward of the zone of contact between the crown gear and interior spline; and
   (d) a resilient seal ring substantially at said pivotal plane carried by said drive shaft to establish a lubricant seal between said shaft and the interior surface of said end portion to complete closure of said cylinder while accommodating misalignment between the axes of said shaft and of said cylinder and axial translation of said shaft relative to said cylinder.

2. The combination set forth in claim 1 wherein said structure supporting said crown gear is of cup shape to which said shaft is secured and into which said open end portion of said wear sleeve extends.

3. In a drive shaft coupling for use at one end of a drive shaft where lubricant is to be maintained in a zone of contact between a drive shaft crown gear meshing with and located inside an annular spline, the combination which comprises:
   (a) a cylinder closed at one end by a pan having a lip which engages one end of said cylinder with said annular spline on the inner wall of said cylinder extending substantially the length of said cylinder;
   (b) a cup nested in said cylinder and having a cup lip portion which supports said crown gear at an outer end thereof, said crown gear having a length which is only a fraction of the length of said spline, said cup having a central coupling to receive one end of said drive shaft to connect said cup thereto, said drive shaft, said cup and said crown gear being axially moveable for variation in the point of contact of said crown gear along the length of said spline;
   (c) a small diameter cylindrical wear sleeve encompassing said end of said drive shaft and having a flange and an open cylindrical end portion, said flange being coupled to said cylinder at the end opposite said closed end to partially close said opposite end, said open cylindrical end portion extending inside said cup to span the pivotal plane of said crown gear; and
   (d) a resilient seal ring mounted between said open cylindrical end portion and on said drive shaft substantially at said pivotal plane of said crown gear to complete a closure of said opposite end by establishing a lubricant seal between said drive shaft and the interior surface of said open cylindrical end portion.

4. The combination of claim 3 and further including: spring means mounted between said pan and said shaft to urge translational movement to said shaft.

* * * * *